July 12, 1960   KUAN-HAN SUN ET AL   2,945,128
FLUORESCENT STRUCTURES AND METHOD OF MANUFACTURE
Filed Dec. 29, 1955
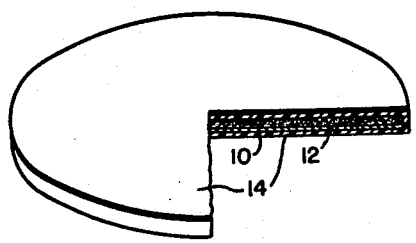
Fig. 1.
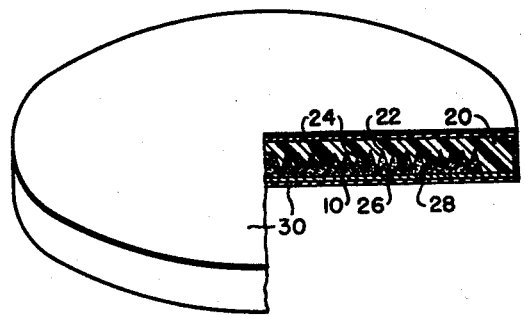
Fig. 2.
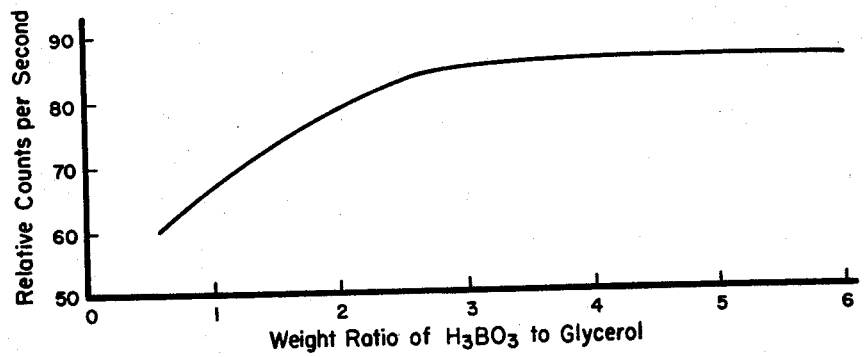
Weight Ratio of $H_3BO_3$ to Glycerol
Fig. 3.
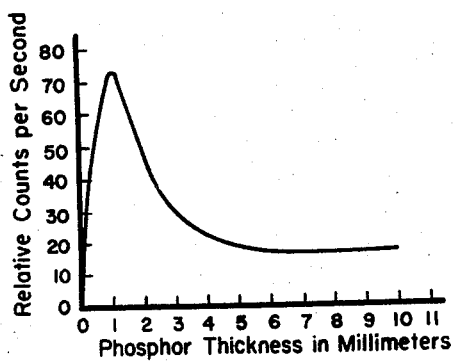
Fig. 4.
Fig. 5.
WITNESSES:
INVENTORS
Kuan-Han Sun, Paul R. Malmberg
and Frances A. Pecjak.
BY
ATTORNEY United States Patent Office
2,945,128
Patented July 12, 1960

2,945,128

FLUORESCENT STRUCTURES AND METHOD OF MANUFACTURE

Kuan-Han Sun and Paul R. Malmberg, Wilkinsburg, and Frances A. Pecjak, Millvale, Pa., assignors to Westinghouse Electric Corporation, East Pittsburgh, Pa., a corporation of Pennsylvania Filed Dec. 29, 1955, Ser. No. 556,173

18 Claims. (Cl. 250—80)

This invention relates to fluorescent structures generally, and more particularly in one aspect thereof, to fluorescent structures adapted for use in scintillation counters as a phosphor for the detection of slow neutrons.

The use of a scintillation counter to detect neutrons has been suggested before, and various phosphors for detecting neutrons have been suggested. For example, see U.S. Patent No. 2,534,932 assigned to the same assignee as this invention. One method that had been suggested was to prepare by a high temperature reaction a glass incorporating a boron-containing material with a fluorescent material. A neutron passing through such a phosphor will react with boron 10 to form lithium 7 with the release of an alpha particle and 2.8 million electron volts. The alpha particle, in turn, will react with the fluorescent material to cause a scintillation which will be detected by an associated photomultiplier tube. Another method suggested was to use a liquid scintillator such as terphenyl in xylene to which a liquid boron-containing compound, such as methyl borate, has been added. While both of the above phosphors can be used to a degree, they are objectionable because of their great sensitivity for gamma rays and their low efficiency for detecting neutrons.

This invention provides a fluorescent material incorporating boron and a method of making it which provides a phosphor for a scintillation counter which has a high efficiency for detecting slow neutrons and is relatively insensitive to gamma radiation. The phosphor of the invention comprises a luminescent material, such as silver-activated zinc sulphide, mixed with a boron type of plastic or a boron type of glass having the approximate composition $HBO_2$. As pointed out above, materials containing boron have been suggested in the past to detect neutrons, but it has always been necessary to use a relatively high temperature on the order of 1000° C. in order to fuse the two materials together to form a usable phosphor. The use of such high temperatures is not desirable, because it greatly reduces the luminescent characteristics of the silver-activated zinc sulphide, thus, greatly reducing the efficiency of the finished phosphor. This invention describes a method for preparing a neutron sensitive phosphor utilizing a boron compound having a melting temperature on the order of 250° C. By utilizing this relatively low temperature, the desirable luminescent characteristics of the silver-activated zinc sulphide or other luminescent material are retained and a very efficient neutron sensitive scintillation phosphor is produced.

Accordingly, an object of this invention is to produce a neutron sensitive phosphor for use in scintillation counters consisting of a transparent boron compound having a relatively low melting temperature and a luminescent material such as silver-activated zinc sulphide.

Another object of this invention is to provide a new and improved fluorescent material which is formed from materials having a low melting temperature.

Another object of this invention is to produce a neutron sensitive phosphor for use in scintillation counters which has a high efficiency for counting slow neutrons while discriminating against gamma radiation.

Another object of this invention is to provide a novel method for producing neutron sensitive phosphors for use in scintillation counters using transparent boron compounds having a relatively low melting temperature and a luminescent material such as silver-activated zinc sulphide.

Another object of this invention is to provide a novel neutron sensitive phosphor for scintillation counters consisting of a transparent boron compound having the approximate composition $HBO_2$ and a luminescent material such as silver-activated zinc sulphide.

Another object of this invention is to provide a novel neutron sensitive phosphor for scintillation counters consisting of glycerol borate polyester and silver-activated zinc sulphide.

These and other objects of this invention will be more easily understood from the following detailed description of the phosphors and method of preparing them, when taken in conjunction with the attached drawings, in which:

Figure 1 is an isometric view shown partly in section of a phosphor constructed in accordance with this invention;

Fig. 2 is an isometric view shown partly in section of another phosphor constructed in accordance with this invention which utilizes a transparent mold having a grooved inner face for increasing the light transmission and thus the efficiency of the phosphor;

Fig. 3 is a curve showing the relationship between the efficiency of the phosphor and the ratio of boric acid to glycerol used in fabricating the boron plastic used in one phosphor;

Fig. 4 is a curve showing the relationship between the efficiency of the phosphor and the phosphor's thickness; and Fig. 5 is a curve showing the relationship between the efficiency of the phosphor and the ratio of zinc sulphide to the boron compound used in fabricating the phosphor.

In order to fabricate a desirable neutron sensitive phosphor, the boron-containing material used should have good optical properties, that is, it should be transparent to scintillations produced by the fluorescent material and colorless so that it will easily transmit light from the scintillation in the fluorescent material to the photomultiplier tube. The boron-containing material should also contain a large proportion of the isotope boron 10 so that a large percentage of the slow neutrons passing through the phosphor will react with the phosphor to produce a scintillation. The boron-containing material should also be capable of intimate admixture with silver-activated zinc sulphide at a relatively low temperature so that a uniform phosphor can be produced without impairing or destroying the luminescent characteristics of the silver-activated zinc sulphide. We have found that silver-activated zinc sulphide will retain its highest luminescent properties if not heated above 250° C. A number of possible boron compounds, fulfilling some of the above requirements, are available, such as boron nitride (BN), boric anhydride ($B_2O_3$) and boric acid ($H_3BO_3$). While boron nitride contains a high proportion of boron and thus is desirable, it melts only at an extremely high temperature, and therefore, it is unsuitable. Boric anhydride, which contains a suitable amount of boron, melts at approximately 580° C., but the melt is very viscous and difficult to manipulate, and therefore, it cannot be employed satisfactorily. Boric acid cannot be used satisfactorily because it decomposes continually on heating instead of melting.

Two boron compounds, which we have found to be especially suitable for use in the fabrication of phosphors to detect neutrons alone in accordance with teachings of this invention, are a certain glycerol borate polyester plastic and a boron glass having the approximate formula $HBO_2$. Both compounds melt at a temperature below 250° C., and thus can be properly combined with silver-activated zinc sulphide without deterioration or harmful results.

The borate polyesters are made by combining boric acid and glycerol and heating the mixture to form a colorless transparent plastic. Weight ratios ranging from one part of boric acid to one part of glycerol up to ten parts of boric acid to one part of glycerol have been investigated, and it was found that at the high ratios, the viscosity of the polyester becomes so high that it cannot be satisfactorily employed. A ratio of six parts by weight of boric acid to one part by weight of glycerol was found to be the highest amount of boric acid which would permit ease of handling of the finished material and still provide a large percentage of boron in the finished product.

While ratios as high as six parts of boric acid to one part of glycerol by weight can be used, we prefer to use in practicing this invention, ratios in the range of from about one to one to about five and a half to one. The using of higher ratios results in only a slight increase in the efficiency of the phosphor but results in a phosphor that is very hygroscopic. In addition, phosphors using borate plastic containing a large amount of boric acid results in a mixture that is powdery and difficult to form into suitable phosphors. The relationship between the counting efficiency of the finished phosphor and the ratio of boric acid to glyercol in the boron compound used for fabricating the finished phosphor is shown in Fig. 3. Only a slight increase in counting efficiency results from an increase of boric acid in the boron compound beyond the weight ratio of five and a half to one. This slight increase in efficiency is greatly outweighed by the increased handling difficulty due to the viscous nature of the boron compound and its hygroscopic nature. Thus, we prefer an upper limit on our ratios of five and a half to one which results in a high efficiency phosphor.

In order to make the borate polyester plastic, a predetermined quantity of glycerol is first heated to approximately its boiling point. Then a predetermined quantity of finely divided crystalline boric acid, for example, of a size that would pass through a screen having twenty meshes per lineal inch, is gradually added to the glycerol while continuously stirring and heating the mixture. After all of the boric acid has been dissolved, the clear liquid borate polyester plastic is poured upon a cold thick aluminum plate in order to solidify the mixture. It is most convenient to solidify the glycerol borate plastic mixture in order to simplify the weighing of the correct amount of the plastic to be combined with the silver-activated zinc sulphide during the final preparation of the phosphor. The cooling step could be dispensed with, if a large number of phosphors having a fixed composition were to be prepared. In this case the proper amount of silver-activated zinc sulphide would be combined directly with the liquid glycerol borate. A glycerol borate polyester plastic having a boric acid-glycerol ratio of five and a half to one prepared in this manner contains approximately 19.4% boron by weight.

A second transparent boron compound, which is more suitable for use in the phosphor in this invention, is a boron glass having the approximate formula $HBO_2$. A boron glass having this approximate formula may be prepared by heating orthoboric acid $H_3BO_3$ in a partially covered container for approximately five hours at a temperature of 210° C. The boron glass prepared in this manner may be poured on a cold aluminum plate to harden the material to facilitate subsequent manipulation of the material. The measured boron content of this material, prepared as described, varies from 25.5 to 26.5% by weight as compared with a computed value of 24.7% for the formula given. Accordingly, it is evident, in this example of the invention, that the aforesaid low-melting boron glass may include a proportion of other acidoboronic compounds, such as tetraboric acid $$(H_2B_4O_7)$$

We prefer to use the boron glass described above because it is relatively non-hygroscopic and contains a much larger percentage by weight of boron. This larger amount of boron results in a phosphor having approximately 10% higher efficiency than one made with glycerol borate. The boron glass is easily mixed with silver-activated zinc sulphide to form a phosphor at a temperature of less than 250° C.

The final step in making a neutron sensitive phosphor from either of the boron compounds described above consists of remelting the proper amount of either compound and combining it with the proper amount of silver-activated zinc sulphide, and then pouring or pressing the mixture into a suitably shaped mold and cooling. When using the borate polyester plastic described above, the desired amount should first be weighed and remelted on an oil bath at about 150° C. to 190° C. The proper amount of silver-activated zinc sulphide, having a particle size of about 10 microns or less, is then added to the melted boron plastic with constant stirring and mixing. The silver-activated zinc sulphide should be preheated to about 160° C. before it is added to the melted boron plastic. In order to prevent charring of the mixture, prolonged heating should be avoided, and the admixing of the phosphor should be completed in approximately one minute. After the zinc sulphide is combined with the boron plastic, the mixture should be transferred to a metal mold and covered with a smooth plate such as a metal or glass plate having a thickness of about ¼ inch and the excess mixture squeezed from the mold, as by means of a suitable press. In order to prevent premature cooling and hardening of the mixture during the pressing operation, the mold, cover plate and press platens should be preheated to about 200° C. and the pressing operation completed as quickly as possible. The resulting phosphor 10 (Fig. 1) is then backed on one side with aluminum foil 12 to increase the light output from the opposite side, and the whole phosphor wrapped in a suitable light transparent plastic film 14 such as polyvinylidene chloride for protection against atmospheric moisture. The phosphor may also be enclosed in a transparent plastic body for protection from moisture.

The method described above was also used for making a neutron sensitive phosphor using the boron glass ($HBO_2$) instead of the borate polyester plastic, except that the combining and molding temperature was kept at about 210° C. to 250° C. instead of 160° C. to 190° C.

Some difficulty was encountered in mixing the silver-activated zinc sulphide with the molten boron glass due to the higher viscosity of this boron glass compound. A method for overcoming this difficulty is to mix the correct amount of the boron glass, which has been reduced to a powder which will pass through a screen which has 60 to 80 meshes per lineal inch, with the required amount of powdered silver-activated zinc sulphide prior to heating. The combined powder mixture is then heated to about 210° C. and transferred to a suitable mold and pressed as described above. A second method for overcoming the above difficulty is to place the mixture of silver-activated zinc sulphide and boron glass powders into a suitable mold and then cover the mold with a smooth plate such as metal or glass having about ¼ inch of thickness and place the mold in a heated press. With this method, a press temperature as low as about 170° C. and a moderate pressure will produce satisfactory neutron sensitive phosphors. Again the completed phosphors should be backed on one side with aluminum foil and wrapped in a suitable film to protect them against atmospheric moisture, or the phosphor may be imbedded in a transparent plastic.

The relationship between the efficiency of the phosphor and the phosphor thickness varies greatly and is shown in Fig. 4. From this curve it can be seen that a phosphor thickness of approximately 1.25 millimeters will give the greatest efficiency. Accordingly, it is preferred to press the phosphors in a mold having a depth of about 1.25 millimeters so that the finished phosphor is approximately 1.25 millimeters thick. A second factor affecting the efficiency of the complete phosphor is the ratio of silver-activated zinc sulphide to the boron compound in the finished phosphor. The relationship between the efficiency and the ratio of silver-activated zinc sulphide of boron compound is shown in Fig. 5. While the efficiency of the phosphor continues to increase gradually beyond a ratio of 1.9, the greater amounts of silver-activated zinc sulphide make the mixture very viscous and difficult to manipulate, thus, resulting in a poor distribution of the silver-activated zinc sulphide in the boron compound. Accordingly, in the preferred embodiment of this invention, the ratio of silver-activated zinc sulphide to the boron compound should be approximately 1:1.9 parts of the zinc sulphide by weight to one part of the boron compound by weight, although we have tried other ratios such as 1:1 to 3:1 which gave fairly satisfactory results except that they were very difficult to prepare.

Shown in Fig. 2 is a modified type of phosphor which utilizes a transparent mold 20 having a circularly grooved inner-faced surface 22 for increasing the amount of light transmitted by the phosphor to the photomultiplier. The increased light transmission results from the increased amount of fluorescent material per unit area of the phosphor while maintaining good light transmission. The mold 20 may be formed from any well-known transparent polyester resin which can be cast in a negative steel mold so as to form the grooved inner face 22 shown in Fig. 2. The surfaces 24 of the grooved inner face 22 should form an included angle of approximately 30° for best results, and the grooves should be approximately .04 inch deep. After the plastic mold has been prepared, the grooved inner-faced side of the mold is filled with either of the fluorescent materials, described above, to a thickness of approximately 1.25 millimeters from the tips 26 of the inner-faced grooves and pressed as described above. To complete this type of phosphor, an aluminum foil 28 is placed on top of the fluorescent material, and the complete phosphor may be wrapped in a suitable transparent film 30 to protect it from atmospheric conditions. The increased light transmission of a phosphor constructed with a plastic mold, as described above, amounts to approximately 60% and results in an increase in overall efficiency of about 33%.

An efficiency of approximately 37% for the counting of slow neutrons was obtained from a phosphor using boron glass having the approximate formula $HBO_2$ and the ratio of silver-activated zinc sulphide to the boron glass of 1.9:1 by weight and a thickness of the phosphor of approximately 1.25 millimeters. The use of boron glass in a phosphor in place of the glycerol borate plastic, results in about a 10% increase in efficiency. The efficiency of the phosphor of this invention could also further be improved by using only the isotope boron 10 or material boron enriched in the isotope boron 10 instead of natural boron which contains only approximately 19 percent by weight of the boron 10 isotope.

The relative simplicity of the method used in the making of the phosphor of this invention readily adapts itself to the fabrication of phosphors having large diameters up to five inches or more, thus allowing the use of photomultiplier tubes having large area photocathodes. The use of such a large diameter phosphor, in combination with a photomultiplier tube having a large photocathode, results in a neutron scintillation counter having great sensitivity.

The materials used in making the phosphors described above are cheap and readily obtained, which in combination with the simple process results in phosphors that are very inexpensive when compared to present phosphors, and yet are more efficient.

Accordingly, this invention should not be limited to the two specific embodiments thereof disclosed herein, but only as required by the prior art as many modifications and changes will occur to those skilled in this art without departing from the spirit or scope of this invention.

We claim as our invention:

1. A fluorescent material comprising, a fused transparent body comprising by weight one part of a boron compound having a fusion point of between 150° C. and 250° C., and from about 1 to 1.9 parts of finely divided silver-activated zinc sulphide uniformly admixed therein.

2. The fluorescent material of claim 1 where the boron compound is selected from the group consisting of glycerol borate polyesters and $HBO_2$.

3. A fluorescent material comprising a fused transparent body comprising a mixture of one part of a transparent boron glycerol polyester consisting of the reaction product of from 1 to 6 parts by weight of boric acid and 1 part by weight glycerol, and from 1 to 1.9 parts by weight of silver-activated zinc sulphide.

4. A fluorescent material comprising by weight one part of a fused transparent boron compound having substantially the composition $HBO_2$ and a fusion point of between 150° C. and 250° C., and from 1 to 1.9 parts of silver-activated zinc sulphide.

5. A process for making a phosphor for a scintillation counter comprising melting a quantity of a transparent boron compound having a fusion point of between 150° C. and 250° C., then adding a quantity of silver-activated zinc sulphide powder which has been preheated to about the temperature of the melted boron compound while constantly mixing the melt, then transferring the melt to a heated metal mold, and then finally pressing between heated press platens to remove the excess material from the mold.

6. A phosphor for a scintillation counter comprising, a disk shaped transparent mold having a grooved face on one side, said grooves forming substantially parallel ridges therebetween, said one side being filled with sufficient fluorescent material to fill said grooves and to cover said ridges, and a metallic foil backing capable of reflecting light mounted on said fluorescent material, whereby the light transmission efficiency of the phosphor is substantially increased.

7. A phosphor for a scintillation counter comprising, a disk shaped transparent mold having a grooved face on one side, said grooves being arranged to form substantially parallel circular ridges therebetween, the other face of said mold being substantially flat, said grooves being filled with a fluorescent material so as to fill said grooves and to cover said one side, said material comprising silver-activated zinc sulphide and a transparent boron compound in the ratio by weight of between 1:1 to 1.9:1, said boron compound having a fusion point of between 150° C. and 250° C., and a metallic foil backing capable of reflecting light mounted on said fluorescent material, whereby the light transmission efficiency of the phosphor is substantially increased.

8. A phosphor for a scintillation counter comprising, a disk shaped transparent mold having a grooved face on one side, said grooves being in the form of circular ridges which terminate in relatively sharp edges, the other face of said mold being substantially flat, said grooves being filled with a fluorescent material so as to cover said one side consisting of silver-activated zinc sulfide and a transparent boron compound having the approximate composition HBO₂ in the ratio by weight of 1:1 to 1.9:1 and a metal foil backing capable of reflecting light mounted on said fluorescent material, whereby the light transmission efficiency of the phosphor is substantially increased.

9. A phosphor for a scintillation counter comprising, a disk shaped transparent mold having a grooved face on one side, said grooves being in the form of circular ridges which terminate in relatively sharp edges, the other face of said mold being substantially flat, said grooves being filled with a fluorescent material so as to cover said one side consisting of silver-activated zinc sulfide and glycerol borate plastic in the ratio by weight of 1:1 to 1.9:1 and a metal foil backing capable of reflecting light mounted on said fluorescent material, whereby the light transmission efficiency of the phosphor is substantially increased.

10. A fluorescent material comprising a fused transparent body comprising one part of a boronic compound having a fusion point between 150 and 250° C., said compound being selected from the group consisting of glycerol borate polyesters and acidoboronic compounds, and 1 to 1.9 parts of finely divided luminescent material uniformly admixed therein.

11. A process for making a fluorescent material comprising the steps of heating orthoboric acid in a partially covered container at a temperature of about 200° C. for a time sufficient to obtain a decomposition product having a melting point in the range of 150 to 250° C., cooling and comminuting said decomposition product, mixing a quantity of pulverulent luminescent material therewith, fusing the mixture thus former, transferring the fused mixture to a heated mold, and pressing the same between heated pressing means to remove the excess material from the mold.

12. A process for making a fluorescent material comprising the steps of heating a quantity of orthoboric acid in a partially covered container at a temperature of about 200° C. for a time sufficient to obtain a decomposition product having a melting point in the range of 150 to 250° C., fusing said decomposition product, adding a quantity of pulverulent luminescent material thereto, which has been heated to approximately the temperature of the melted decomposition product while mixing the melt, transferring the melt to a heated mold, and pressing the same between heated pressing means to remove the excess material from the mold.

13. A phosphor for a scintillation counter comprising a discoid transparent mold having a grooved face on one side thereof, said grooves forming substantially parallel ridges therebtween and a quantity of fluorescent material coated on said one side in sufficient depth to fill said grooves and to cover said ridges, whereby the light transmission efficiency of the phosphor is substantially increased.

14. A phosphor for a scintillation counter comprising a discoid transparent mold having a grooved face on one side thereof, said grooves being arranged to form substantially parallel circular ridges therebetween, the opposite face of said mold being substantially flat, and a fluorescent material coated on said one side to a depth sufficient to fill said groove and to cover said ridges, said material comprising a luminescent material and a transparent boronic compound having a melting point between 150 and 250° C., whereby the light transmission efficiency of the phosphor is substantially increased.

15. A fluorescent material comprising a fused transparent body including one part by weight of a boronic compound having a fusion point between 150° C. and 250° C. and 1 to 1.9 parts by weight of finely divided luminescent material uniformly admixed therein.

16. A process for making a phosphor for a scintillation counter comprising the steps of melting a quantity of a transparent acidoboronic compound having a fusion point of between 150 and 250° C., adding a quantity of a luminescent material which has been preheated to approximately the temperature of said melted compound while mixing the melt, transferring the melt to a heated mold and pressing between heated pressing means to remove the excess material from the mold.

17. A process for making a fluorescent material comprising the steps of heating orthoboric acid in a partially covered container at a temperature of about 200° C. for a time sufficient to obtain a decomposition product having a melting point in the range of 150 to 250° C., cooling and comminuting said decomposition product, mixing a quantity of pulverulent luminescent material therewith, fusing the mixture thus formed, and then cooling the mixture.

18. A process for making a fluorescent material comprising the steps of heating a quantity of orthoboric acid in a partially covered container at a temperature of about 200° C. for a time sufficient to obtain a decomposition product having a melting point in the range of 150 to 250° C., fusing said decomposition product, adding a quantity of pulverulent luminescent material thereto while mixing the melt, and then cooling the melt.

References Cited in the file of this patent

UNITED STATES PATENTS

| | | |
|---|---|---|
| 742,245 | Simon | Oct. 27, 1903 |
| 2,224,852 | Lowry | Dec. 17, 1940 |
| 2,418,423 | Pellerano | Apr. 1, 1947 |
| 2,575,046 | Chavannes et al. | Nov. 13, 1951 |
| 2,660,686 | Putnam | Nov. 24, 1953 |
| 2,673,371 | Uhlig | Mar. 30, 1954 |
| 2,680,205 | Burton | June 1, 1954 |
| 2,682,478 | Howse | June 29, 1954 |

FOREIGN PATENTS

| | | |
|---|---|---|
| 107,566 | Australia | May 26, 1939 |

OTHER REFERENCES

Leverenz: Luminescence of Solids, 1950, page 468.